UNITED STATES PATENT OFFICE.

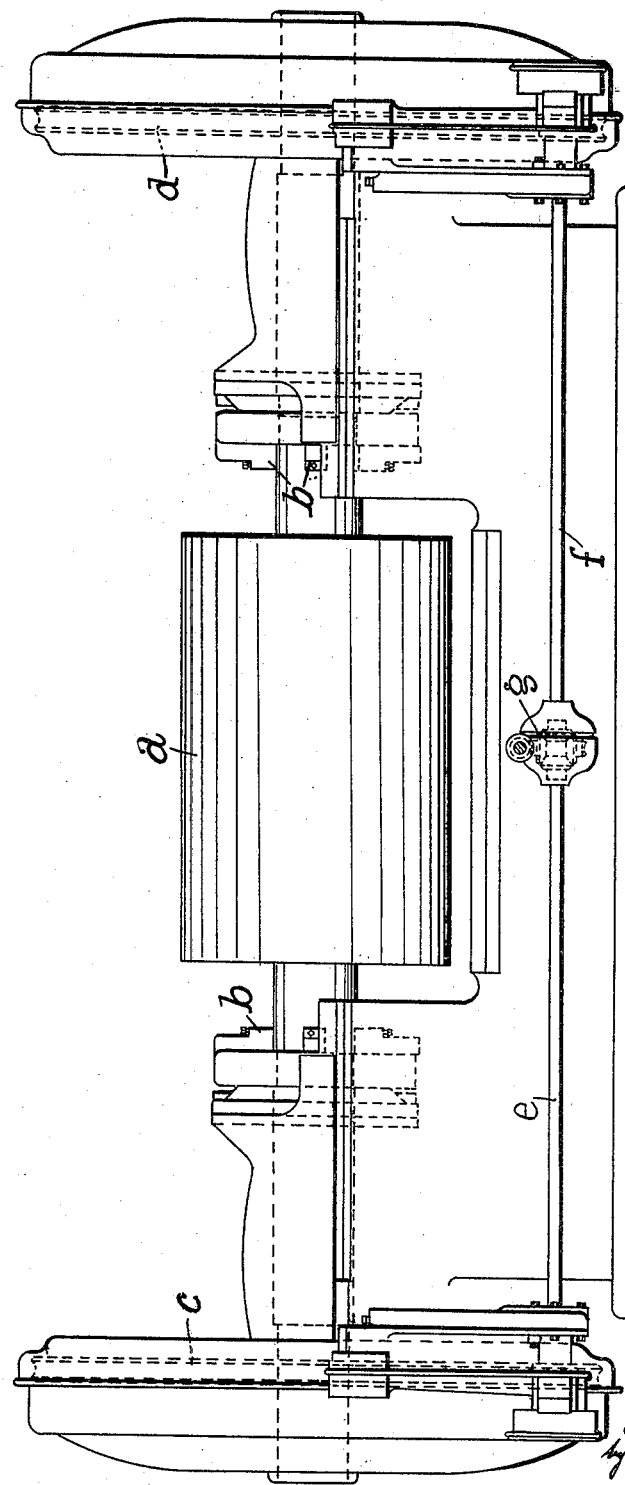

PERCY BROWN AND FRANCIS J. BOSTOCK, OF HUDDERSFIELD, ENGLAND.

GEAR CUTTING, GENERATING, OR LIKE MACHINE.

1,316,825. Specification of Letters Patent. Patented Sept. 23, 1919.

Application filed November 19, 1917. Serial No. 202,756.

*To all whom it may concern:*

Be it known that we, PERCY BROWN and FRANCIS JOHN BOSTOCK, subjects of King George V of Great Britain, residing at Huddersfield, in the county of York, England, have invented a new and useful Improvement in Gear Cutting, Generating, or like Machines, of which the following is a specification.

Our invention relates to machines for cutting the teeth of double helical wheels, or to other gear cutting, generating or like machines and has for its object an improved arrangement and combination of parts of the machine whereby any errors in the teeth of the dividing wheels will be considerably reduced in the work being operated upon.

Referring to the accompanying drawing, our invention consists in securing the work or blank $a$ in any suitable manner or by any suitable means, as by jaws $b$ or the like, to the opposing ends of the shafts of two dividing wheels $c$, $d$ so that the said work or blank will be rigidly held by and between the said shafts.

The two dividing wheels $c$, $d$ are suitably driven from respective shafts $e$, $f$ actuated from a common differential gear box $g$. We find by this arrangement and combination that any error in the teeth of either of the dividing wheels will not be reproduced fully in the work $a$ being operated upon in the machine, but will be approximately halved or reduced to a negligible extent during the actual revolution of the dividing wheels.

Having thus described our invention, what we claim as new and desire to secure by Letters Patent is:—

1. In a gear cutting machine, two shafts journaled axially in line with each other and provided at their adjacent ends with means for holding the work, dividing wheels secured to the said shafts, and a single differential driving mechanism operatively connected to the said dividing wheels.

2. In a gear cutting machine, two shafts journaled axially in line with each other and provided at their adjacent ends with means for holding the work, dividing wheels secured to the said shafts, two revoluble countershafts arranged axially in line with each other and having their outer ends operatively connected with the said driving wheels, and a single differential driving mechanism connected to the adjacent ends of the two countershafts.

In testimony whereof we affix our signatures in the presence of two witnesses.

PERCY BROWN.
FRANCIS J. BOSTOCK.

Witnesses:
THOMAS H. BARRON,
MARY BARRON.

Copies of this patent may be obtained for five cents each, by addressing the "Commissioner of Patents, Washington, D. C."